(12) United States Patent
Kasuya et al.

(10) Patent No.: US 8,773,462 B2
(45) Date of Patent: Jul. 8, 2014

(54) APPARATUS, SYSTEM, AND METHOD OF SHARING DRAWING DATA

(75) Inventors: Yuuji Kasuya, Kanagawa (JP); Tadashi Araki, Kanagawa (JP); Keiji Ohmura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 368 days.

(21) Appl. No.: 13/043,726

(22) Filed: Mar. 9, 2011

(65) Prior Publication Data
US 2011/0221773 A1 Sep. 15, 2011

(30) Foreign Application Priority Data

Mar. 15, 2010 (JP) .................................. 2010-057237
Dec. 24, 2010 (JP) .................................. 2010-287093

(51) Int. Cl.
*G09G 5/00* (2006.01)

(52) U.S. Cl.
USPC ............. 345/629; 345/2.1; 345/2.2; 345/636; 345/637; 715/751

(58) Field of Classification Search
USPC .................. 345/2.2, 629, 636, 637, 641, 2.1; 715/751
See application file for complete search history.

(56) References Cited

U.S. PATENT DOCUMENTS

| | | | |
|---|---|---|---|
| 2004/0125110 A1 | 7/2004 | Kohda et al. | |
| 2006/0012612 A1 | 1/2006 | Johnston et al. | |
| 2006/0174206 A1* | 8/2006 | Jung et al. ...................... 715/751 |
| 2007/0083597 A1 | 4/2007 | Salesky et al. | |
| 2007/0152992 A1 | 7/2007 | Kohda et al. | |
| 2007/0222747 A1 | 9/2007 | Kritt et al. | |
| 2011/0210908 A1* | 9/2011 | Kasuya et al. ................. 345/2.2 |
| 2012/0218276 A1 | 8/2012 | Kohda et al. | |
| 2012/0233553 A1* | 9/2012 | Barrus .......................... 715/751 |

FOREIGN PATENT DOCUMENTS

| | | | |
|---|---|---|---|
| JP | 2005-121747 A | 5/2005 |
| JP | 2005-203886 | 7/2005 |
| JP | 2007-17543 A | 1/2007 |
| WO | WO 02/071380 A2 | 9/2002 |

OTHER PUBLICATIONS

Combined Chinese Office Action and Search Report issued Feb. 28, 2013 in Patent Application No. 201110062465.6 with English Translation of Category of Cited Documents.
U.S. Appl. No. 13/036,577, filed Feb. 28, 2011, Kasuya, et al.
Communication pursuant to Article 94(3) EPC issued Feb. 11, 2014, in application No. 11 250 260.4-1958.

* cited by examiner

*Primary Examiner* — Chante Harrison
(74) *Attorney, Agent, or Firm* — Oblon, Spivak, McClelland, Maier & Neustadt, L.L.P.

(57) ABSTRACT

A drawing image sharing apparatus combines a drawing image of a remotely located site and a background image to be displayed onto a drawing object for display onto the drawing object, generates a differential image based on the difference between a captured image of the drawing object and the combined image, and transmits the differential image to the remotely located site.

19 Claims, 9 Drawing Sheets

US 8,773,462 B2

APPARATUS, SYSTEM, AND METHOD OF SHARING DRAWING DATA

CROSS-REFERENCE TO RELATED APPLICATIONS

This patent application is based on and claims priority under 35 U.S.C. §119 to Japanese Patent Application Nos. 2010-057237, filed on Mar. 15, 2010, and 2010-287093, filed on Dec. 24, 2010, in the Japanese Patent Office, the entire disclosure of which is hereby incorporated herein by reference.

FIELD OF THE INVENTION

The present invention generally relates to sharing of drawing data, and more specifically to an apparatus, system, and method of sharing drawing data among a plurality of remotely located sites.

BACKGROUND

The recent technology allows image data to be shared among a plurality of remotely located sites to facilitate communication among the plurality of sites. For example, Japanese Patent Application Publication No. 2005-203886 describes a system, which includes two projectors that are located at different places, and a server that transmits an image to each of the projectors for projection onto a screen through each projector. Each projector captures an image drawn onto the whiteboard, and transmits the captured image to the server. The server combines an original image with the captured image received from the projector, and sends the combined image to another projector for projection onto the screen through another projector.

In the system described in Japanese Patent Application Publication No. 2005-203886, projection of the combined image onto the screen is interrupted at a predetermined interval as the system needs to capture the image drawn onto the whiteboard to generate the combined image for projection.

SUMMARY

In view of the above, one aspect of the present invention provides a system, apparatus, and method of sharing drawing data among a plurality of remotely located sites, each capable of generating an image to be displayed with improved visibility.

Another aspect of the present invention provides a system, apparatus, and method of sharing drawing data among a plurality of remotely located sites, each capable of displaying a drawing image in a manner that is superimposed on a background image such that the background image is shared among the plurality of remotely located sites.

Example embodiments of the present invention include an apparatus, method, system, computer program and product each capable of combining a drawing image of a remotely located site and a background image to be displayed onto a drawing object for display onto the drawing object, generating a differential image based on the difference between a captured image of the drawing object and the combined image, and transmitting the differential image to the remotely located site.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
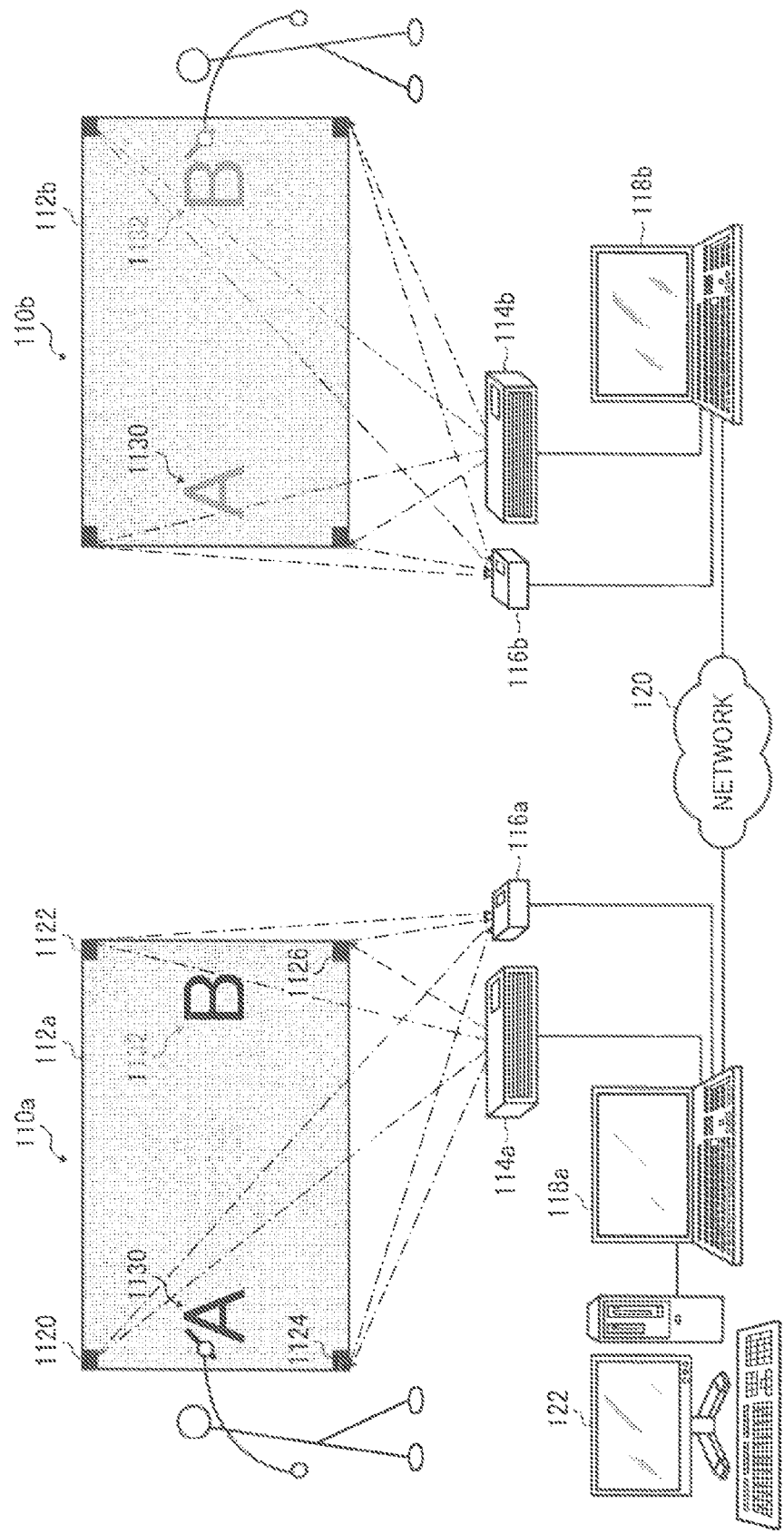
FIG. 1 is an illustration for explaining a drawing data sharing system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 illustrates a drawing data sharing system 100 according to an example embodiment of the present invention. The drawing data sharing system 100 includes two sites including a site 110a and a site 110b, which are remotely located from each other. For example, a user at the site 110a and a user at the site 110b are made communicable with each other through a network 120 such as the Internet, local area network (LAN), or wide area network (WAN). In FIG. 1, only two sites 110a and 110b are shown for the descriptive purposes. Alternatively, the drawing data sharing system 100 may be designed to include more than two sites. Further, any desired number of sites may be made communicable with one another through a leased line.

The site 110a is provided with a drawing object ("object") 112a, a display device 114a, an image capturing device 116a, a drawing image sharing apparatus 118a, and a background image supply apparatus 122. The site 110b is provided with a drawing object ("object") 112b, a display device 114b, an image capturing device 116b, and a drawing image sharing apparatus 118b, each of which are similar in function and structure to the drawing object ("object") 112a, the display device 114a, the image capturing device 116a, and the drawing image sharing apparatus 118a, which are each provided at the site 110a. For the descriptive purposes, the objects 112a and 112b, the display devices 114a and 114b, the image capturing devices 116a and 116b, and the drawing image sharing apparatuses 118a and 118b may be collectively referred to as the object 112, the display device 114, the image capturing device 116, and the drawing image sharing apparatus 118, respectively.

The object 112a allows the user at the site 110a to draw thereon any desired drawings, while displaying thereon an image that is displayed by the display device 114a. For example, the object 112a may be implemented by any desired material on which the user at the site 110a can write any drawings such as characters or figures, such as a white board, a black board, or a paper sheet. In FIG. 1, the object 112a displays a character "A" 1130 drawn by the user at the site 110a, which is one example of drawings. The object 112a further displays thereon an image displayed by the display device 114a, such as a character "B" 1132 drawn by the user at the site 110b. The user may draw an image using any desired writing tool such as whiteboard marker.

The display device 114a is any device that displays an image onto the object 112a, such as the drawing image of the site 110b that is received from the site 110b through the network 120 and/or a background image. For example, the display device 114a may be implemented by a projector. In FIG. 1, the display device 114a displays the drawing image of the site 110b, which includes the character "B" 1132, onto the object 112a of the site 110a. In this example, the background image is any image to be displayed onto the object 112a or 112b as a background of the drawings such as the character "A" 1130 or the character "B" 1132.

In this example, a display image such as the drawing image of the site 110b is displayed through the object 112a and the display device 114a. In alternative to using the object 112a and the display device 114a, any display device such as a liquid crystal display or plasma display may be used to display the display image such as the drawing image of the site 110b. In such case, the display device's screen may be covered over with a transparent film or board to allow the user to draw drawings on the film or board. In another example, the display device's screen may be implemented as a touch panel screen, which allows the user to draw drawings on the screen. When the display device such as the liquid crystal display or plasma display is used, the background image may be any desired screen of the display device.

The image capturing device 116a is any device that captures an image being displayed onto the object 112a as a captured image. The captured image includes a drawing image that reflects drawings drawn by the user onto the object 112a, a display image that is displayed by the display device 114a based on the drawing image that reflects drawings drawn onto the object 112b by the user at the site 112b, or the background image being displayed onto the object 112b. For example, the image capturing device 116a may be implemented by a digital camera, digital video camera, web camera, etc., which is capable of capturing an image being displayed onto the object 112a. In this example, the image capturing device 116a captures the image being displayed onto the object 112a, according to an instruction received from the drawing image sharing apparatus 118a, when the drawing image sharing apparatus 118a receives the drawing image drawn onto the object 112b from the site 110b or the background image from the background image sharing apparatus 122. Alternatively, the image capturing device 116a may capture the image being displayed onto the object 112a at a predetermined time interval under control of the drawing image sharing apparatus 118a.

The drawing image sharing apparatus 118a extracts the drawing image that reflects drawings drawn onto the object 112a and/or the background image, from the captured image of the object 112a that is captured by the image capturing device 116a. The drawing image sharing apparatus 118a sends the extracted drawing image of the site 110a and/or the background image to the site 110b. The drawing image sharing apparatus 118a further causes the display device 114a to display a drawing image that reflects drawings drawn onto the object 112b and received from the site 110b, onto the object 112a. Further, in this example, the drawing image sharing apparatus 118a may combine the background image received from the background image sharing apparatus 122 and the drawing image received from the site 110b to generate a combined image for display onto the object 112a. In this manner, the drawing image that reflects drawings drawn by each user and the background image are shared among a plurality of sites. For example, the drawing image sharing apparatus 118a may be implemented by any desired computer such as a notebook computer or a desktop computer.

Further, in this example, the drawing image sharing apparatus 118 of the drawing data sharing system 100 operates in two modes including a background image supply mode and a background image receive mode.

The background image supply mode is a mode in which the apparatus 118 supplies the background image to the outside apparatus. More specifically, the drawing image sharing apparatus 118, which operates under the background image supply mode, causes the display device 114 to display a background image received from the background image supply apparatus 122 onto the object 112 as a display image, and further transmits the received background image to the drawing image sharing apparatus 118 of the remotely located site for display.

The background image receive mode is a mode in which the apparatus 118 uses the background image for processing. More specifically, the drawing image sharing apparatus 118, which operates under the background image receive mode, causes the display device 114 to display the drawing image and the background image that are respectively received from the remotely located site as a combined image.

In this example, the drawing image sharing apparatus 118a is switched to the background image supply mode when the drawing image sharing apparatus 118a receives the background image and/or a request for displaying the background image from the background image supply apparatus 122. The drawing image sharing apparatus 118b is switched to the background image receive mode when the drawing image sharing apparatus 118b receives the background image and/or a request for displaying the background image from the drawing image sharing apparatus 118a of the remotely located site.

The drawing image sharing apparatus 118 includes a processor such as a central processing unit (CPU), and a memory. The processor may be implemented by the PENTIUM processor or PENTIUM compatible processor. The memory may be implemented by a volatile memory such as a random access memory (RAM), and a nonvolatile memory such as a read only memory (ROM) or a hard disk device (HDD). More specifically, the ROM or HDD stores various programs and data to be used by the processor. The RAM functions as a work memory of the processor to allow the processor to execute the program read out from the ROM or HDD. In this example, the memory of the drawing image sharing apparatus 118 stores therein a drawing image sharing program, which is executed by the processor under an operating systems, such as Windows-series OS, MAC OS, UNIX OS, or LINUX OS. The drawing image sharing program may be written in any desired programming language such as assembler, C, C++, Java, Java Script, PERL, RUBY, PHYTON, etc. Upon execution of the drawing image sharing program, the processor causes a computer to operate or function as the drawing image sharing apparatus 118. The drawing image sharing apparatus 118 further includes an interface, such as a peripheral device interface for connection with a peripheral device such as the display device 114 or the image capturing device 116, and a network interface for connection with the network 120. Through the interface, the drawing image sharing apparatus 118 communicates with the peripheral device to transmit various data such as the image to be displayed by the display device 114 to the display device 114 or the captured image captured by the image capturing device 116 from the image capturing device 116. The drawing image sharing apparatus 118 communicates with the drawing image sharing apparatus 118 at the remotely located site 110 to transmit or receive various data such as the drawing image to or from the drawing image sharing apparatus 118 of the remotely located site through the network 120.

Still referring to FIG. 1, the background image supply apparatus 122 supplies a background image to be displayed onto the object 112a to the drawing image sharing apparatus 118a. In this example, the background image supply apparatus 122 obtains the background image from a memory, such as an internal memory of the background image supply apparatus 122 or a HDD that is connected to the background image supply apparatus 122. The background image supply apparatus 122 transmits the background image to the drawing image sharing apparatus 118a with a request for displaying the background image. In the example illustrated in FIG. 1, the background image sharing apparatus 122 is connected to the drawing image sharing apparatus 118a through a LAN to transmit various data through the LAN.

The background image supply apparatus 122 may be implemented by any desired computer such as a notebook computer or a desktop computer. Alternatively, the background image supply apparatus 122 may be implemented by a data server that is connected to the drawing image sharing apparatus 118a through the network such as LAN, WAN, or the Internet. In alternative to obtaining the background image from its internal memory, the background image supply apparatus 122 may obtain the background image from a memory in the drawing image sharing apparatus 118a such as HDD of the drawing image sharing apparatus 118a.

In another example, the background image supply apparatus 122 may be incorporated into the drawing image sharing apparatus 118a, for example, in the form of a circuit or a plurality of instructions.

Any one of operations or functions of the drawing image sharing apparatus 118 may be performed according to a plurality of instructions that are written in the form of computer program using any desired programming language and is instable onto any computer. The drawing image sharing program may be stored in any desired memory such as a hard disk device, or a removable medium such as CD-ROM, MO, flexible disk, EEPROM, or EPROM, for example, for distribution. Further, the drawing image sharing program may be distributed over the network in the form readable by a device such as a computer.

Although not described above, the devices or apparatuses provided at the site 110b operate in a substantially similar manner as the devices or apparatuses provided at the site 110a.

Further, a structure of the drawing image sharing system 100 is not limited to this example shown in FIG. 1. For example, the display device 114a, the image capturing device 116a, and the drawing image sharing apparatus 118a may be incorporated into one apparatus. In another example, the drawing image sharing system 100 may be additionally provided with a server that manages data to be shared among the plurality of remotely located sites 110a and 110b through the drawing image sharing apparatuses 118a and 118b.

Figure 2:
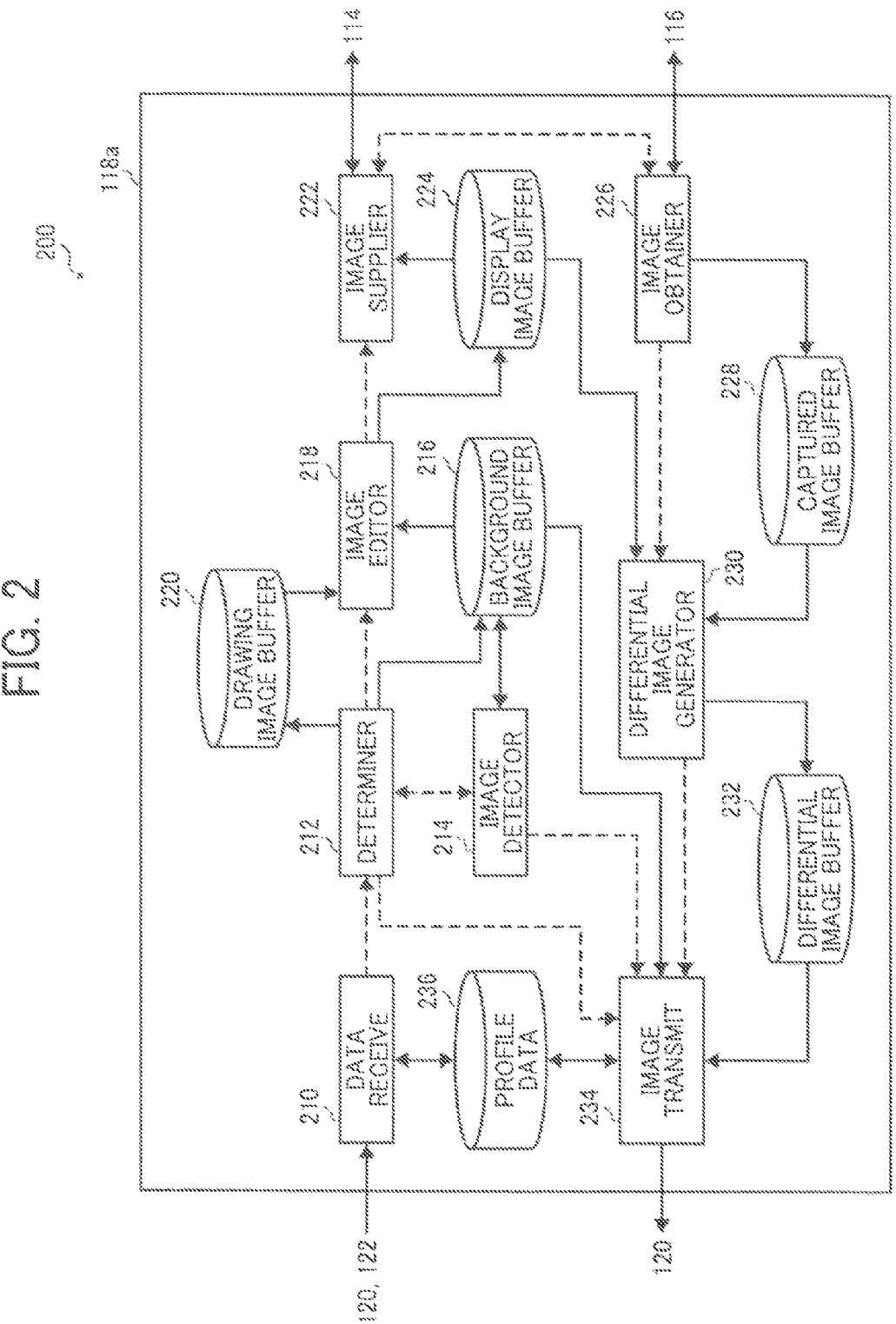
FIG. 2 is a schematic block diagram illustrating a functional structure of a drawing image sharing apparatus of FIG. 1, according to an example embodiment of the present invention.

FIG. 2 illustrates a functional structure 200 of the drawing image sharing apparatus 118a. The drawing image sharing apparatus 118a includes a data receive 210, a determiner 212, an image detector 214, a background image buffer 216, an image editor 218, a drawing image buffer 220, an image supplier 222, a display image buffer 224, an image obtainer 226, a captured image buffer 228, a differential image generator 230, a differential image buffer 232, an image transmit 234, and a profile data memory 236.

The data receive 210 receives a request and/or image data from the background image supply apparatus 122 or the drawing image sharing apparatus 118b of the site 110b. More specifically, the data receive 210 receives a background image from the background image supply apparatus 112 or the drawing image sharing apparatus 118b that operates under the background image supply mode. Alternatively or additionally, the data receive 210 receives the drawing image from the drawing image sharing apparatus 118b of the site 110b. The image data such as the background image or the drawing image is received together with a request regarding the image data. When the request or the image data is received, the data receive 210 notifies the determiner 212 that the request or the image data is received. In this example, the data receive 210 receives the background image from the background image supply apparatus 122. Alternatively, the data receive 210 may obtain the background image from any desired memory in the drawing image sharing apparatus 118a such as HDD.

Before establishing communication with the drawing image sharing apparatus 118b of the site 110b, the data receive 210 receives profile data regarding the drawing image sharing apparatus 118b. The data receive 210 stores the profile data in the profile data memory 236. The profile data memory 236 is assumed to previously store therein profile data regarding the drawing image sharing apparatus 118a. The profile data includes information regarding a function, process capability, or performance of the drawing image sharing apparatus 118. Examples of profile data include, but not limited to, information indicating whether the drawing image sharing apparatus 118 has a function of combining the drawing image and the background image to generate a combined image, and information indicating the time required for completing the operation of generating the combined image.

The determiner 212 determines a type of the request received from the background image supply apparatus 122 or the drawing image sharing apparatus 118b, and causes other devices or units to perform processing according to the received request. Examples of request include, but not limited to, a request for displaying the background image, a request for displaying the drawing image, a request for displaying a combined image of the background image and the drawing image, and a request for requesting the outside apparatus to re-send the background image. In addition to the type of request, the determiner 212 is able to obtain identification information for identifying an apparatus that sends such request from the request received from the apparatus.

When the determiner 212 determines that a request for displaying the background image is received from the background image supply apparatus 122, the determiner 212 causes the drawing image sharing apparatus 118a to operate under the background image supply mode. The determiner 212 further causes the drawing image sharing apparatus 118a to detect the background image that is received together with the request for displaying, or to transmit the background image to the remotely located site, using other devices such as the image detector 214 or the image editor 218.

When the determiner 212 determines that the background image is received from the background image supply apparatus 122, the determiner 212 causes the drawing image sharing apparatus 118a to add the identification information for identifying the background image, which may be referred to as the background image identification, to the background image. For example, the background image identification is associated with the background image as metadata. The drawing image sharing apparatus 118a further stores the background image in the background image buffer 216.

When the determiner 212 determines that a request for displaying the background image is received from the drawing image sharing apparatus 118b, the determiner 212 causes the drawing image sharing apparatus 118a to operate under the background image receive mode to store the background image that is received together with the request for displaying in the background image buffer 216. The determiner 212 further causes the image editor 218 to combine the background image and the drawing image received from the remotely located site to generate a combined image, and causes the image supplier 222 to transmit the combined image to the display device 114a for display onto the object 112a.

When the determiner 212 determines that a request for displaying the drawing image is received when the drawing image sharing apparatus 118a that operates under the background image supply mode or the background image receive mode, the determiner 212 stores the drawing image in the drawing image buffer 220 at least temporarily. In this example, the drawing image buffer 220 is implemented by a RAM. Further, in this example, it is assumed that the drawing image buffer 220 replaces the drawing image that is previously stored with the drawing image that is recently stored.

When the determiner 212 determines that the combined image of the background image and the drawing image is received from the drawing image sharing apparatus 118b of the site 110b, the determiner 212 causes the image supplier 222 to transmit the received combined image to the display device 114a for display onto the object 112a.

When the determiner 212 determines that a request for re-sending the background image is received from the drawing image sharing apparatus 118b, the determiner 212 obtains the background image from the background image buffer 216, and sends the background image through the image transmit 234 to the drawing image sharing apparatus 118b.

The image detector 216 determines whether the background image received at the data receive 210 is the same as the background image stored in the background image buffer 216.

The background image buffer 216 is a data buffer that stores the background image. The background image buffer 216 may be implemented by a memory such as a RAM that is capable of storing the background image at least temporarily. The background image buffer 216 stores the background image being currently displayed onto the object 112a together with the background image identification. In this example, the drawing image sharing apparatus 118a that operates in the background image supply mode stores only the most updated background image in the background image buffer 216. The drawing image sharing apparatus 118a that operates in the background image receive mode stores all background images that are previously received from the remotely located site.

When the determiner 212 determines that a request for displaying the background image is received from the background image supply apparatus 122, the determiner 212 causes the drawing image sharing apparatus 118a to operate under the background image supply mode. According to an instruction received from the determiner 212, the image detector 214 compares the background image received from the background image supply apparatus 122 with the currently displayed background image stored in the background image buffer 216 to determine whether the background images are the same. For example, the image detector 214 may determine whether the background images are the same using template matching or characteristics features extracting. When it is determined that the background images are different from each other, the image detector 214 stores the background image received from the background image supply apparatus 122 in the background image buffer 216, and causes the image transmit 234 to send the background image to the remotely located site.

When the determiner 212 determines that a request for displaying the background image is received from the drawing image sharing apparatus 118b of the site 110b, the determiner 212 causes the drawing image sharing apparatus 118a to operate under the background image receive mode. The image detector 214 stores the received background image in the background image buffer 216.

The image editor 218 applies edit processing to the background image received from the background image supply apparatus 112 or the drawing image received from the remotely located site to generate a display image to be displayed onto the object 112a. The image editor 218 obtains the drawing image from the drawing image buffer 220, and the background image from the background image buffer 216. The image editor 218 further combines the drawing image and the background image to generate a combined image for display. In this example, the image editor 218 may combine the images, for example, by replacing backgrounds using mask processing or object combining. Alternatively, the image editor 218 may combine the images, for example, by using alpha blending in which pixel values of images to be combined are combined with a predetermined ratio, or by determining a pixel value of the combined image based on the lowest one of the brightness values of the images to be combined.

Alternatively, the image editor 218 may apply processing to the drawing image to generate the processed drawing image to thicken the boundaries of the drawing image. When a brightness value of the pixel in the processed drawing image is equal to or less than a threshold, a pixel value of the combined image is determined to have the brightness value of the pixel in the processed drawing image. When a brightness value of the pixel in the processed drawing image is greater than the threshold, a pixel value of the combined image is determined to have the brightness value of the pixel in the background image.

The image editor 218 may further apply image correction to the background image to be displayed onto the object 112a. For example, image correction includes size enlargement or size reduction of the background image, and adjustment in luminance value of the background image.

Further, the image editor 218 may enlarge or reduce the size of the image to be displayed such that the image to be displayed fits in an area to be shared with the drawing image sharing apparatus 118b. More specifically, the image obtainer 226 stores the shared area size indicating the size of the area to be shared in the memory such as the RAM. The image editor 218 reads out the shared area size from the memory to compare it with the actual size of the image to be displayed. When it is determined that the size differs between the shared area and the image to be displayed, the image editor 218 calculates the ratio between the shared area and the display image, and enlarges or reduces the size of the display image using the calculated ratio.

The image editor 218, after applying image processing to the display image, stores the processed display image in the display image buffer 224, and sends an instruction for displaying the display image to the image supplier 222.

When the drawing image sharing apparatus 118 operates under the background image receive mode, the image editor 218 determines whether the background image buffer 216 stores therein the background image relating to the drawing image of the remotely located site. More specifically, the image detector 214 stores the background image received from the remotely located site in the background image buffer 216 in association with the background image identification. The image editor 218 determines whether the background image relating to the drawing image of the remotely located site is stored in the background image buffer 216, using the background image identification of the background image. When it is determined that the background image is not stored in the background image buffer 216, the image editor 218 instructs the image transmit 234 to send a request for requesting the drawing image sharing apparatus 118b of the remotely located site to send the background image.

Assuming that the drawing image sharing apparatus 118b operates under the background image supply mode, the drawing image sharing apparatus 118b receives the request from the drawing image sharing apparatus 118a for sending the background image. The drawing image sharing apparatus 118b reads out the background image from the background image buffer 216, and sends the background image to the drawing image sharing apparatus 118a through the image transmit 234. In this manner, even when the background image is not stored in the drawing image sharing apparatus 118a, for example, due to an error in writing the background image to the background image buffer 216 or an error in transmission, the background image is sent to the drawing image sharing apparatus 118a before the drawing image sharing apparatus 118a displays the drawing image.

The image supplier 222 causes the display device 114a to display a drawing image received from the remotely located site onto the object 112a. Further, in this example, after displaying the display image through the display device 114a, the image supplier 222 starts the waiting process for holding at least the process of capturing for a predetermined time period. More specifically, when the image supplier 222 receives a request for displaying the drawing image from the image editor 218, the image supplier 222 reads out the display image from the display image buffer 224, and sends the display image to the display device 114a for display onto the object 112a. The image supplier 222 then starts the waiting process to start counting a time period to obtain a counter value, for example, using the timer function. When the counter value reaches a predetermined value, the image supplier 222 requests the image obtainer 226 to sends an instruction for capturing the image of the object 112a to the image capturing device 116a.

In this example, the predetermined value that specifies a time for waiting process is set to 0 to 1000 ms. By holding the process of capturing the image of the drawing object 112a for a predetermined time, the image capturing device 116a is able to capture the image of the object 112a after the display image being displayed is stabilized, thus improving the image quality of the captured image.

Further, in this example, the image supplier 222 causes the display device 114a to display a marker image onto the object 112a, such as a maker image including markers 1120, 1122, 1124, and 1126 illustrated in FIG. 1. The marker image may be previously stored in the nonvolatile memory of the drawing image sharing apparatus 118a such as the HDD. The image supplier 222 reads out the marker image from the nonvolatile memory to display the marker image through the display device 114a. In this example, the image supplier 222 causes the display device 114a to display the marker image onto the object 112a when the drawing image sharing apparatus 118a is powered on. Alternatively, the image supplier 222 may cause the display device 114a to display the marker image at any time, for example, according to an instruction received from the image obtainer 226 or at a predetermined time interval that is previously set by the user or by default.

In this example, the marker image is defined by the markers of blue color, however, any other color may be used in replace of blue color. Further, in this example, the markers defining the marker image each have a rectangular shape, however, any other shape such as triangular or quadrant shape may be used in replace of rectangular shape. Further, in this example, the shared area is specified by the markers each corresponding to the corner of the shared area, however, the shared area may be specified in various other ways. For example, each of the markers may be arranged at the middle of the border line of the shared area to specify the shared area.

The image obtainer 226 obtains an image to be shared with the remotely located site, which includes an image being displayed onto an area to be shared with the remotely located site. More specifically, in this example, the image obtainer 226 causes the image capturing device 116a to capture an image of the object 112a including the drawing image drawn onto the object 112a and the display image displayed by the display device 114a as a captured image. The image obtainer 226 performs perspective transformation on the captured image obtained by the image capturing device 116a, for example, by applying image correction to the captured image such as keystone correction, aspect ratio correction to correct the length-to-width ratio, and/or rotation correction.

As illustrated in FIG. 1, the image obtainer 226 specifies a shared area of the object 112a, which is to be shared with the remotely located site, using the marker image including markers 1120, 1122, 1124, and 1126. The markers 1120 to 1126 of the marker image specifies the shared area on the object 112a. Further, the image obtainer 226 calculates the size of the shared area that is specified by the markers 1120 to 1126 of the marker image. When the image obtainer 226 receives the request for capturing from the image supplier 222, the image obtainer 226 causes the image capturing device 116a to capture the image of the object 112a, and applies perspective transformation to the captured image obtained from the image capturing device 116a. The image obtainer 226 detects the coordinate value of each of the markers 1120 to 1126 from the captured image, and specifies the shared area based on assumption that the detected coordinate values of the markers 1120 to 1126 correspond to the coordinate values of the corners of the shared area. The image obtainer 226 calculates the size of the shared area using the corner coordinate values of the shared area, i.e., the coordinate values of the markers 1120 to 1126. The corner coordinate values of the shared area and the size of the shared area are respectively stored in the memory, such as the RAM or HDD of the drawing image sharing apparatus 118a.

In alternative to the above-described example, the image obtainer 226 may specify the shared area of the object 112a and calculate the size of the shared area, without using the markers 1120 to 1126 of the marker image. In such case, the image supplier 222 causes the display device 114a to display a white color image, which is stored in the memory such as the display image buffer 224, onto the object 112a. The image obtainer 226 may specify the coordinate values of corners of the shared area, based on the difference in brightness between an area where the white color image is displayed and the area where the white color image is not displayed. Once the coordinate values of corners of the shared area are specified, the image obtainer 226 calculates the size of the shared area using the corner coordinate values of the shared area. In this example, it is assumed that the display image buffer 224 previously stores at least one of the marker image having the markers 1120 to 1126 and the white color image having a predetermined size in any desired memory of the drawing image sharing apparatus 118a. For the descriptive purposes, the marker image and the white color image or any image that may be used for specifying the area to be shared may be collectively referred to as a reference image.

When the image obtainer 226 receives a request for capturing, the image obtainer 226 causes the image capturing device 116a to capture an image of the object 112a to obtain the captured image from the image capturing device 116a. The image obtainer 226 applies perspective transformation to the captured image, and extracts an image of the shared area from the captured image using the coordinate values of the corners of the shared image and/or the size of the shared area that are respectively read out from the memory. The extracted image of the shared area is stored in the memory such as the captured image buffer 228, which may be implemented by RAM or HDD, of the drawing image sharing apparatus 118a. Once the image of the shared area is stored, the image obtainer 226 sends a request for generating the differential image to the differential image generator 230.

In the above-described example, the image obtainer 226 of the drawing image sharing apparatus 118a applies perspective transformation to the captured image. Alternatively, the drawing image sharing system 100 may be provided with a perspective transformation circuit that applies perspective transformation to the captured image captured by the image capturing device 116a according to an instruction received from the image obtainer 226 of the drawing image sharing apparatus 118a.

Still referring to FIG. 2, the differential image generator 230 generates a differential image, which indicates the difference between the previous display image stored in the display image buffer 224 and the captured image stored in the captured image buffer 228. When the differential image generator 230 receives from the image obtainer 226 a request for generating a differential image, the differential image generator 230 obtains the previous display image from the display image buffer 224 and the captured image from the captured image buffer 228, and generates a differential image using the captured image and the previous display image. In this example, as the drawing image sharing apparatus 118a and 118b each performs capturing of the image to be shared before display of the image to be shared, the captured image may not contain a drawing image that reflects drawings drawn by the user. For this reason, the drawing image sharing apparatus 118a generates a differential image, based on the difference between the previous display image, and the captured image including the drawing image that reflects drawings just drawn by the user at the site 110a. With this differential image, which is the drawing image that reflects the drawings drawn by the user at the site 110a and not included in the previous display image, the drawing image sharing apparatus 118b is able to display the drawing image of the site 110a even when capturing of the image at the site 110a is performed in prior to display of the image received from the site 110b. Similarly, the drawing image sharing apparatus 118b generates a differential image, which is the drawing image that reflects the drawings drawn by the user at the site 110b and not included in the previous display image, and transmits the drawing image of the site 110b to the drawing image sharing apparatus 118a for display onto the object 112a.

In this example, the differential image generator 230 may adjust the position of the display image or the captured image using, for example, template matching, features extraction, or correspondence information of the images.

For example, the differential image generator 230 erodes or dilates the boundaries of the drawing image in the previous display image obtained through the data buffer 220 using a filter including, for example, Morphological operations such as Erode and Dilate filter, or smoothing filter. This suppresses the negative influences that may be otherwise caused by the positional shift of the drawing image in the previous display image with respect to the captured image.

The differential image generator 230 respectively segments the previous display image and the captured image into color components of red (R), green (G), and blue (B) to obtain the images of R, G, and B color components for the previous display image and the captured image.

In one example, the differential image generator 230 generates the differential image that reflects the difference between the previous display image and the captured image, by calculating the average ratio value of each pixel respectively in the previous display image and the captured image for each of the R, G, and B color component images. The average ratio value of a target pixel is a brightness value of the target pixel, which is calculated by multiplying the brightness value of the background color with the average ratio of the brightness value of the target pixel with respect to the average value of the brightness values of pixels surrounding the target pixel. The average ratio value of a target pixel having the coordinate value (x, y) is calculated as follows.

First, the differential image generator 230 specifies a rectangle having the length m and the width n, which surrounds the target pixel (x, y). In this example, m and n are each previously defined as an arbitrary integer.

Second, the differential image generator 230 calculates the average value AVE of the brightness values of the pixels that are included in the m×n rectangle, using an integral image of the captured image for a selected color component.

Third, the differential image generator 230 multiplies the brightness value of the background color of the captured image with the average ratio value of the target pixel (x,y). The average ratio value of the target pixel (x.y) is the ratio of the brightness value of the target pixel (x,y) with respect to the average value AVE of the brightness values of the pixels included in the m×n rectangle. Assuming that the object 112a is a white board, the brightness value of the background color of the captured image is 200. When the average value AVE is greater than 1, the average ratio value of the target pixel (x,y) is assumed to be the same as the brightness value of the background color. Further, the brightness value of the background color may be previously defined by the user. In this example, the brightness value of the background color is set based on the brightness value of the background image included in the captured image.

In another example, the differential image generator 230 generates the differential image by calculating the average differential value of each pixel respectively in the display image and the captured image for each of the R, G, and B color component images. The average differential value of a target pixel is a brightness value of the target pixel, which is calculated by subtracting the average value of the brightness values of pixels surrounding the target pixel from the brightness value of the target pixel. The average differential value of a target pixel having the coordinate value (x, y) is calculated as follows.

First, the differential image generator 230 specifies a rectangle having the length m and the width n, which surrounds the target pixel (x, y). In this example, m and n are each previously defined as an arbitrary integer.

Second, the differential image generator 230 calculates the average value AVE of the brightness values of the pixels that are included in the m×n rectangle, using an integral image of the captured image for a selected color component.

Third, the differential image generator 230 subtracts the average value AVE of the brightness values of the pixels included in the m×n rectangle, from the brightness value of the target pixel (x,y).

In one example, the differential image generator 230 calculates the difference in pixel values between the average ratio value of the target pixel in the captured image and the brightness value of the target pixel in the previous display image to obtain a differential value of the target pixel between the captured image and the previous display image. In another example, the differential image generator 230 calculates the difference in pixel values between the average differential value of the target pixel in the captured image and the average differential value of the target pixel in the previous display image to obtain a differential value of the target pixel between the captured image and the previous display image. The differential image generator 230 obtains the differential value between the captured image and the previous display image for all of the pixels, respectively, for the R, G, and B color component images, and generates R, G, and B color components respectively having pixels with the obtained differential values. The differential image generator 230 further combines the R, G, and B color components to obtain the differential image.

The differential image generator 230 may further apply filtering process to the differential image to cut the yellow color component of the differential image. The differential image generator 230 compares the differential value of the brightness value between the background color and one of the red color component and the green color component, with respect to the differential value of the brightness value between the background color and the blue color component. More specifically, the differential image generator 230 obtains the differential value of the brightness value between the background color and the red color component ("red differential value"), the differential value of the brightness value between the background color and the green color component ("green differential value"), and the differential value of the brightness value between the background color and the blue color component ("blue differential value"). When the blue differential value is greater than the greater one of the red differential value and the green differential value, the differential image generator 230 sets the blue differential value to a value obtained by multiplying the greater one of the red differential value and the green differential value with a constant. When the blue differential value is equal to or less than the greater one of the red differential value and the green differential value, the differential image generator 230 keeps the blue differential value as it is.

For example, assuming that the brightness value of the background color is 200, the brightness value of the red color component is 190, the brightness value of the green color component is 180, and the brightness value of the blue color component is 140, the differential values with respect to the background color are 10 for the red color component, 20 for the green color component, and 60 for the blue color component. In such case, the blue differential value of 60 is greater than either one of the red differential value of 10 and the green differential value of 20. Accordingly, the blue differential value is set to 40, which is obtained by multiplying the greatest one of the red differential value and the green differential value, which is 20, with a constant such as "2". The brightness value of the blue color component is thus 160, which is obtained by subtracting the newly set blue differential value of 40 from the background brightness value of 200. In this example, the constant may be any arbitrary number. In order to sufficiently reduce the level of the yellow color component affected by a light emitted from the display device 114a, the constant may be preferably set to an arbitrary number that ranges between 1 and 2. In this manner, the yellow component that may be introduced by the light source of the display device 114a is removed, thus improving the visibility of the image.

Once the differential image is generated, the differential image generator 230 stores the differential image in the memory such as the differential image buffer 232, which may be implemented by RAM, at least temporally. The differential image generator 230 further requests the image transmit 234 to send the differential image to the remotely located site.

The image transmit 234 sends the differential image, which is the drawing image, generated by the differential image generator 230 to the drawing image sharing apparatus 118b of the remotely located site thorough the network 120. Further, the image transmit 234 may send the drawing image together with the background image supplied by the background image supply apparatus 122, or the combined image of the drawing image and the background image, to the drawing image sharing apparatus 118b. When transmitting the image data or the background image to the drawing image sharing apparatus 118b, the image transmit 124 sends a request for displaying the image data.

As described above, since the drawing image of one site is transmitted to the other site for display without being combined with the drawing image of the other site, the resultant display image is not affected by echo phenomenon, thus improving visibility of the display image.

Further, in this example, when transmitting the drawing image of the site 110a that is generated by the differential image generator 230, the image transmit 234 may obtain the background image identification of the background image stored in the background image buffer 216, and associate the background image identification with the differential image as metadata of the differential image. The background image identification may be expressed in terms of numeral, character, or sign that uniquely identifies the background image, ID or time stamp that is generated based on a combination of numeral, character, or sign, or an arbitrary name.

In case the background image is not stored in the background image buffer 216, the image transmit 234 sends a request for sending the background image to the drawing image sharing apparatus 118b that operates under the background image supply mode. In this example, it is assumed that at the time when the drawing image sharing apparatus 118a establishes communication with the drawing image sharing apparatus 118b, the drawing image sharing apparatus 118a sends profile data of the drawing image sharing apparatus 118a, which is stored in the profile data memory 236, to the drawing image sharing apparatus 118b.

Figure 3:
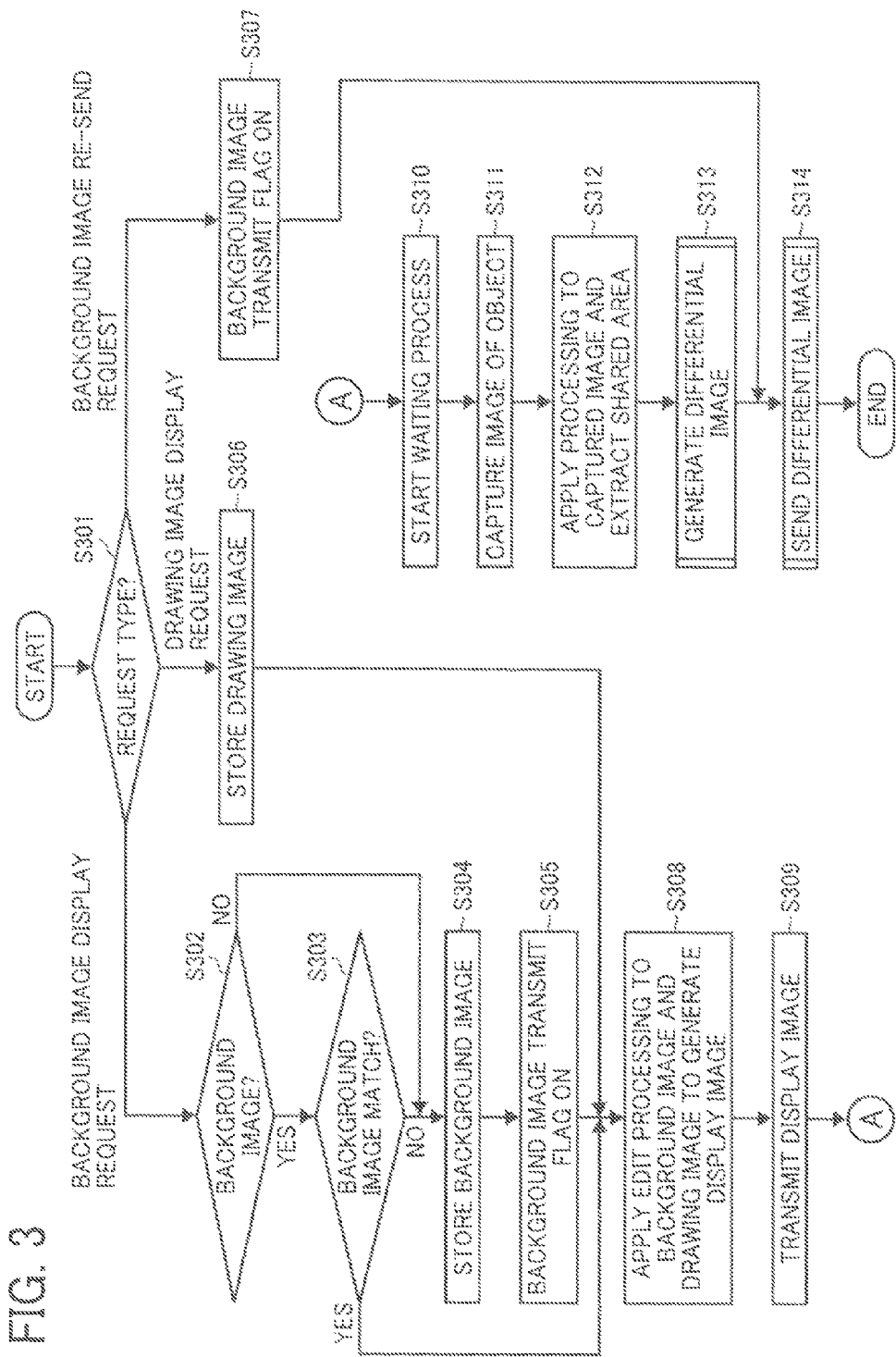
FIG. 3 is a flowchart illustrating operation of processing an image to be displayed onto an object, performed by the drawing image sharing apparatus of FIG. 1 that operates under a background image supply mode, according to an example embodiment of the present invention.

Referring now to FIG. 3, operation of processing image data in the background image supply mode, performed by the drawing image sharing apparatus 118a, is explained according to an example embodiment of the present invention. The operation of FIG. 3 is performed when the data receive 210 of the drawing image sharing apparatus 118a receives a request from the background image supply apparatus 122 or the drawing image sharing apparatus 118b of the site 110b.

At S301, the determiner 212 determines a type of the request received from the background image supply apparatus 122 or the drawing image sharing apparatus 118b of the site 110b. When it is determined that the request is a request for displaying the background image ("BACKGROUND IMAGE DISPLAY REQUEST"), the operation proceeds to S302.

At S302, the image detector 214 determines whether the background image is stored in the background image buffer 216. When it is determined that the background image is not stored ("NO" at S302), the operation proceeds to S304. When it is determined that the background image is stored ("YES" at S302), the operation proceeds to S303.

At S303, the image detector 214 determines whether the background image received from the outside matches the background image stored in the background image buffer 216. When it is determined that the received background image matches the stored background image ("YES" at S303), the operation proceeds to S308. When it is determined that the received background image does not match the stored background image ("NO" at S303), the operation proceeds to S304.

At S304, the image detector 214 stores the received background image in the background image buffer 216.

At S305, the image detector 214 changes the value of a background image transmit flag to "ON". The background image transmit flag specifies whether to transmit the background image. When it has the value "ON", it is determined that the background image is to be sent. In this example, it is assumed that the value of the background image transmit flag is changed to "OFF", which is the initial value, when the operation of FIG. 3 is started.

At S301, when the determiner 212 determines that the request received from the outside is a request for displaying the drawing image ("DRAWING IMAGE DISPLAY REQUEST" at S301), the operation proceeds to S306.

At S306, the determiner 212 stores the drawing image received from the drawing image sharing apparatus 118b of the site 110b in the drawing image buffer 220, and the operation proceeds to S308.

At S301, when the determiner 212 determines a type of the request received from the outside is a request for requesting the drawing image sharing apparatus 118a to re-send the background image ("BACKGROUND IMAGE RE-SEND REQUEST" at S301), the operation proceeds to S307.

At S307, the determiner 212 changes the value of a background image transmit flag to "ON", and the operation proceeds to S314.

At S308, the image editor 218 applies edit processing to the background image stored in the background image buffer 216 and the drawing image stored in the drawing image buffer 220 to generate a display image to be displayed onto the object 112a.

At S309, the image supplier 222 sends the display image to the display device 114a to display the display image onto the object 112a.

At S310, the drawing image sharing apparatus 118a starts the process of waiting. More specifically, in this example, the drawing image sharing apparatus 118a starts counting a timer period to obtain a counter value. When the counter value reaches a predetermined value, the operation proceeds to S311.

At S311, the image obtainer 226 causes the image capturing device 116a to capture an image of the object 112a to obtain the captured image.

At S312, the image obtainer 226 applies image correction to the captured image, and extracts an area to be shared from the captured image. The image obtainer 226 stores the extracted shared area in the captured image buffer 228 as the captured image.

At S313, the differential image generator 330 generates a differential image, which may be referred to as the drawing image, as described below referring to FIG. 7.

At S314, the image transmit 234 transmits the background image, the drawing image, or the combined image of the background image and the drawing image, and the operation ends.

Figure 4:
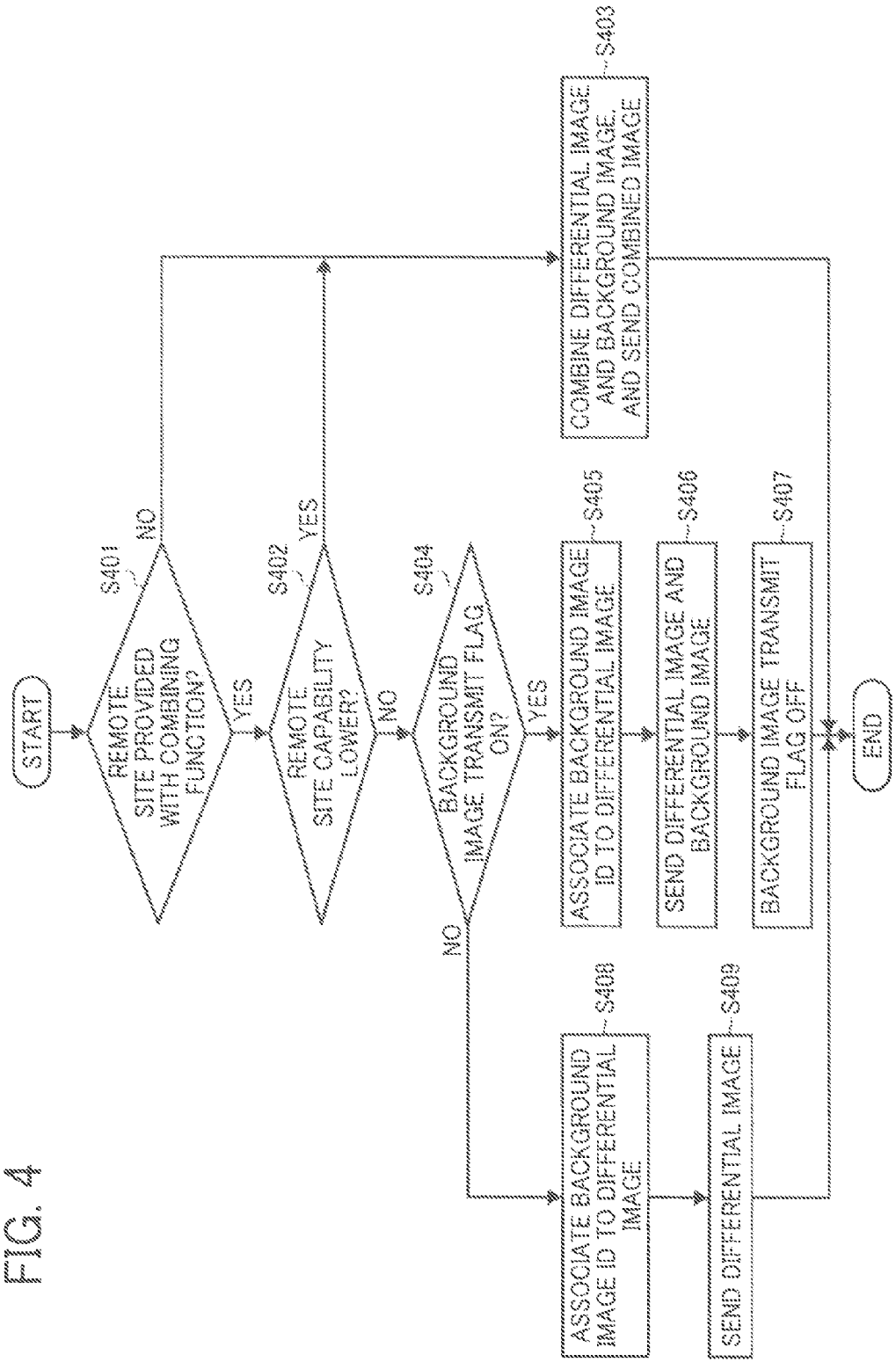
FIG. 4 is a flowchart illustrating operation of transmitting an image to be displayed, performed by the drawing image sharing apparatus of FIG. 1 that operates under a background image supply mode, according to an example embodiment of the present invention.

Referring now to FIG. 4, operation of transmitting image data, performed by the drawing image sharing apparatus 118a of the drawing image sharing apparatus 118a, is explained according to an example embodiment of the present invention. The operation of FIG. 4 may be performed at S314 of FIG. 3.

At S401, the image transmit 234 refers to the profile data of the site 110b, which is stored in the profile data memory 236, to determine whether the drawing image sharing apparatus 118b to which the image data is to be transmitted has a function of generating the combined image.

When it is determined that the drawing image sharing apparatus 118b of the site 110b has the combined image generating function ("YES" at S401), the operation proceeds to S402. When it is determined that the drawing image sharing apparatus 118b of the site 110b does not have the combined image generating function ("NO" at S401), the operation proceeds to S403.

At S402, the image transmit 234 determines whether the drawing image sharing apparatus 118b of the site 110b is higher in processing capability than the drawing image sharing apparatus 118a, using profile data stored in the profile data memory 236. In this example, the image transmit 234 determines the processing capability based on the time required for generating the combined image of the background image and the drawing image.

When it is determined that the drawing image sharing apparatus 118b of the site 110b is lower in processing capability than the drawing image sharing apparatus 118a ("YES" at S402), the operation proceeds to S403. When it is determined that the drawing image sharing apparatus 118b of the site 110b is higher in processing capability than the drawing image sharing apparatus 118a ("NO" at S402), the operation proceeds to S404.

At S403, the image transmit 234 reads out the background image from the background image buffer 216, and the differential image from the differential image buffer 232. The image transmit 234 further combines the background image and the differential image to generate a combined image. The image transmit 234 sends the combined image with a request for displaying the combined image to the drawing image sharing apparatus 118b, and the operation ends. Alternatively, the image transmit 234 may cause the image editor 218 to combine the background image and the differential image into the combined image.

At S404, the image transmit 234 determines whether the background image transmit flag is "ON" indicating that the background image is to be transmitted. When it is determined that the background image transmit flag is ON ("YES" at S404), the operation proceeds to S405.

At S405, the image transmit 234 reads out the differential image from the differential image buffer 232, and the background image identification of the background image stored in the background image buffer 216. The image transmit 234 further adds the background image identification to the differential image as metadata.

At S406, the image transmit 234 sends the differential image and the background image, which are not combined together, to the drawing image sharing apparatus 118b together with a request for displaying the images.

At S407, the image transmit 234 initializes the background image transmit flag to have the value "OFF", and the operation ends.

At S404, when it is determined that the background image transmit flag is not "ON" ("NO" at S404), the operation proceeds to S408.

At S408, the image transmit 234 reads out the differential image from the differential image buffer 232. The image transmit 234 adds the background image identification of the background image stored in the background image buffer 216 to the differential image as metadata of the differential image.

At S409, the image transmit 234 transmits the differential image, as the drawing image for display, to the drawing image sharing apparatus 118b together with a request for displaying the drawing image, and the operation ends.

Figure 5:
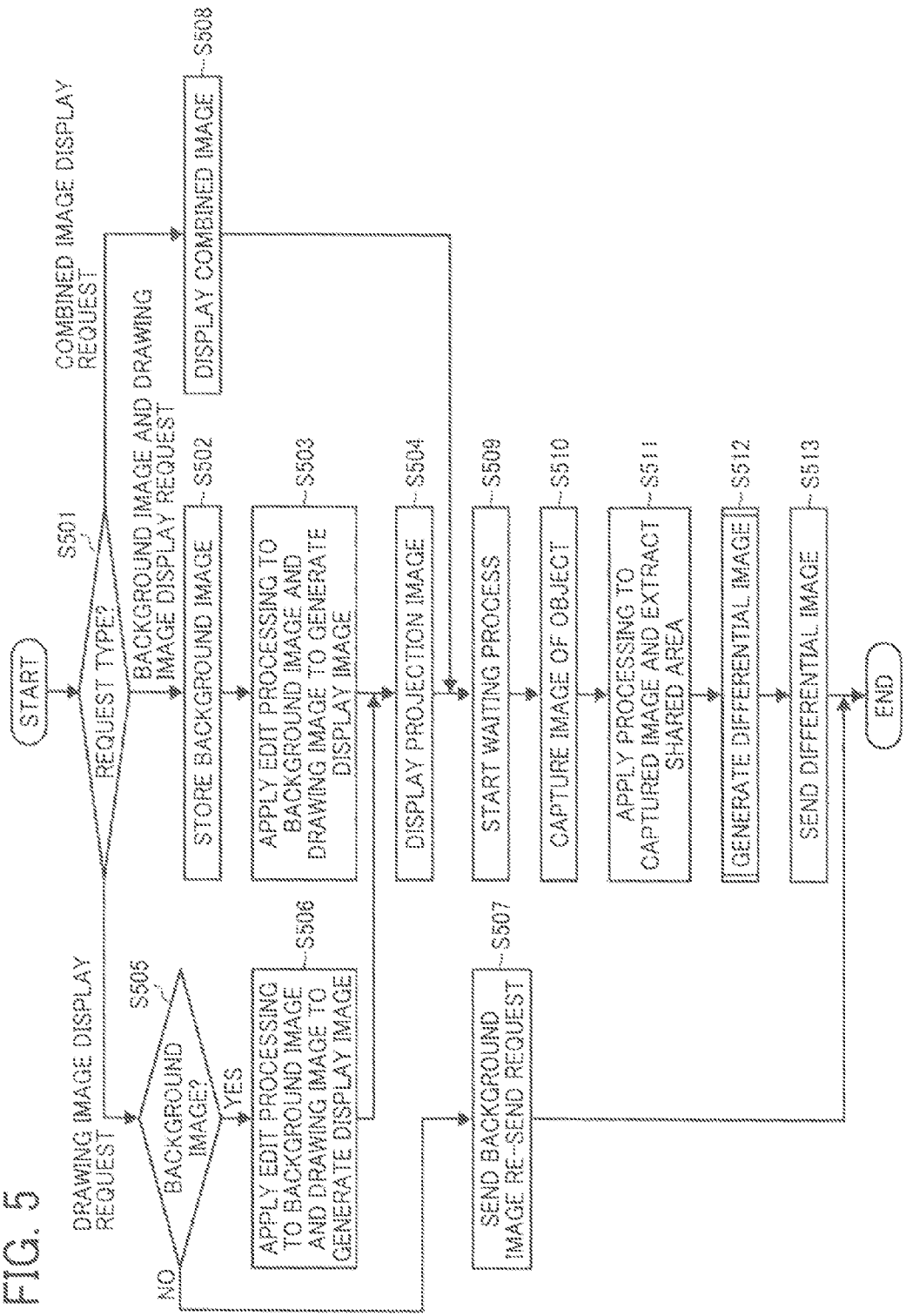
FIG. 5 is a flowchart illustrating operation of processing an image to be transmitted to a remotely located site, performed by the drawing image sharing apparatus of FIG. 1 that operates under a background image receive mode, according to an example embodiment of the present invention.

Referring now to FIG. 5, operation of processing image data under the background image receive mode, performed by the drawing image sharing apparatus 118, is explained according to an example embodiment of the present invention. The operation of FIG. 5 is performed by the drawing image sharing apparatus 118b provided with a function of combining the images, when the drawing image sharing apparatus 118b receives a request from the drawing image sharing apparatus 118a.

At S501, the determiner 212 of the drawing image sharing apparatus 118b analyzes a type of the request received from the drawing image sharing apparatus 118a. When it is determined that the request is a request for displaying the background image and the drawing image ("BACKGROUND IMAGE AND DRAWING IMAGE DISPLAY REQUEST" at S501), the operation proceeds to S502.

At S502, the determiner 212 stores the background image, which is sent together with the request for displaying the background image and the drawing image, in the background image buffer 216.

At S503, the image editor 218 obtains the drawing image received together with the request for displaying the background image and the drawing image, and the background image stored in the background image buffer 216. The image editor 218 applies edit processing to the drawing image and the background image to generate a display image to be displayed.

At S504, the image supplier 222 sends the display image to the display device 114b for display onto the object 112b.

At S501, when it is determined that the request is a request for displaying the drawing image ("DRAWING IMAGE DISPLAY REQUEST" at S501), the operation proceeds to S505.

At S505, the determiner 212 determines whether the background image is stored in the background image buffer 216. When it is determined that the background image is stored ("YES" at S505), the operation proceeds to S506.

At S506, the image editor 218 obtains the drawing image that is sent together with the request for displaying the drawing image, and the background image stored in the background image buffer 216. The image editor 218 further applies edit processing to the drawing image and the background image to generate a display image for display onto the object 112b. In this example, the image editor 218 searches the background image buffer 216 to obtain the background image specified by the background image identification of the background image that is added to the drawing image as metadata.

At S504, the image supplier 222 transmits the display image generated at S506 to the display device 114b to cause the display device 114b to display the display image onto the object 112b.

When it is determined that the background image is not stored in the background image buffer 216 ("NO" at S505), the operation proceeds to S507.

At S507, the image transmit 234 sends a request for requesting the drawing image sharing apparatus 118a to re-send the background image to the drawing image sharing apparatus 118b, and the operation ends.

In the above-described example, the drawing image sharing apparatus 118b requests the drawing image sharing apparatus 118a of the remotely located site to send the background image, when the background image is not available to the drawing image sharing apparatus 118b due to an error in transmission of the background image or an error in writing the background image into the background image buffer 216.

At S501, when it is determined that the request is a request for displaying a combined image of the drawing image and the background image ("COMBINE IMAGE DISPLAY REQUEST" at S501), the operation proceeds to S508.

At S508, the image supplier 222 transmits the combined image of the drawing image and the background image to the display device 114b as a display image to be displayed onto the object 112b.

At S509, the image supplier 222 starts the waiting process in a substantially similar manner as described above referring to S310 of FIG. 3.

At S510, the image obtainer 226 obtains an image of the object 112b, which is captured by the image capturing device 116b, as a captured image.

At S511, the image obtainer 222 applies image correction to the captured image, extracts an area to be shard from the processed captured image, and stores the extracted shared area as the captured image in the captured image buffer 228.

At S512, the differential image generator 230 generates a differential image as described below referring to FIG. 7.

At S513, the image transmit 234 transmits the differential image generated at S512 to the drawing image sharing apparatus 118a together with a request for displaying the drawing image, and the operation ends.

Figure 6:
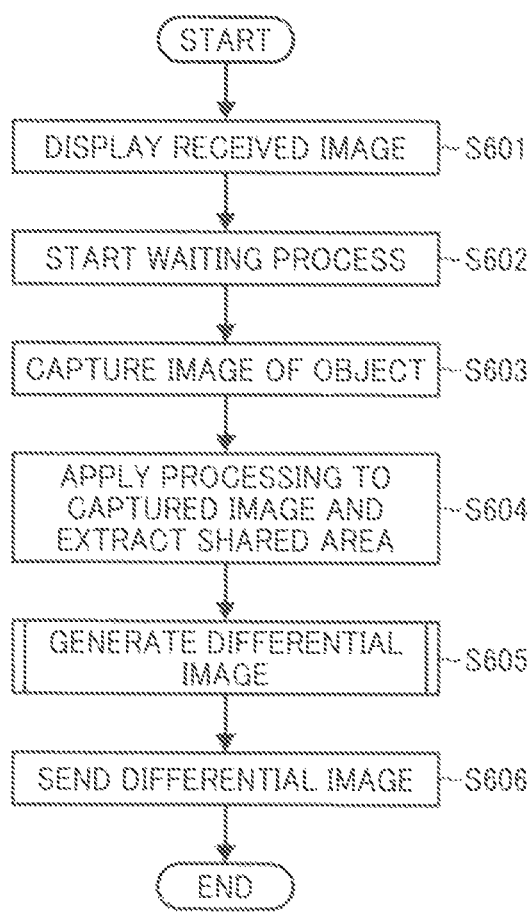
FIG. 6 is a flowchart illustrating operation of processing an image to be transmitted to a remotely located site, performed by the drawing image sharing apparatus of FIG. 1 that operates under a background image receive mode, according to an example embodiment of the present invention.

Referring now to FIG. 6, operation of processing image data, performed by the drawing image sharing apparatus 118b that operates under the background image receive mode, is explained according to an example embodiment of the present invention. More specifically, the operation of FIG. 6 is performed by the drawing image sharing apparatus 118b that is not provided with a function of combining the images, when the data receive 210 receives a request for displaying the combined image of the background image and the drawing image from the remotely located site.

At S601, the image supplier 222 transmits the received image data to the display device 114b for display onto the object 112b. The received image data is a combined image generated by the drawing image sharing apparatus 118a.

S602 to S606 are performed in a substantially similar manner as described above referring to S509 to S513 of FIG. 5, and the operation ends.

Figure 7:
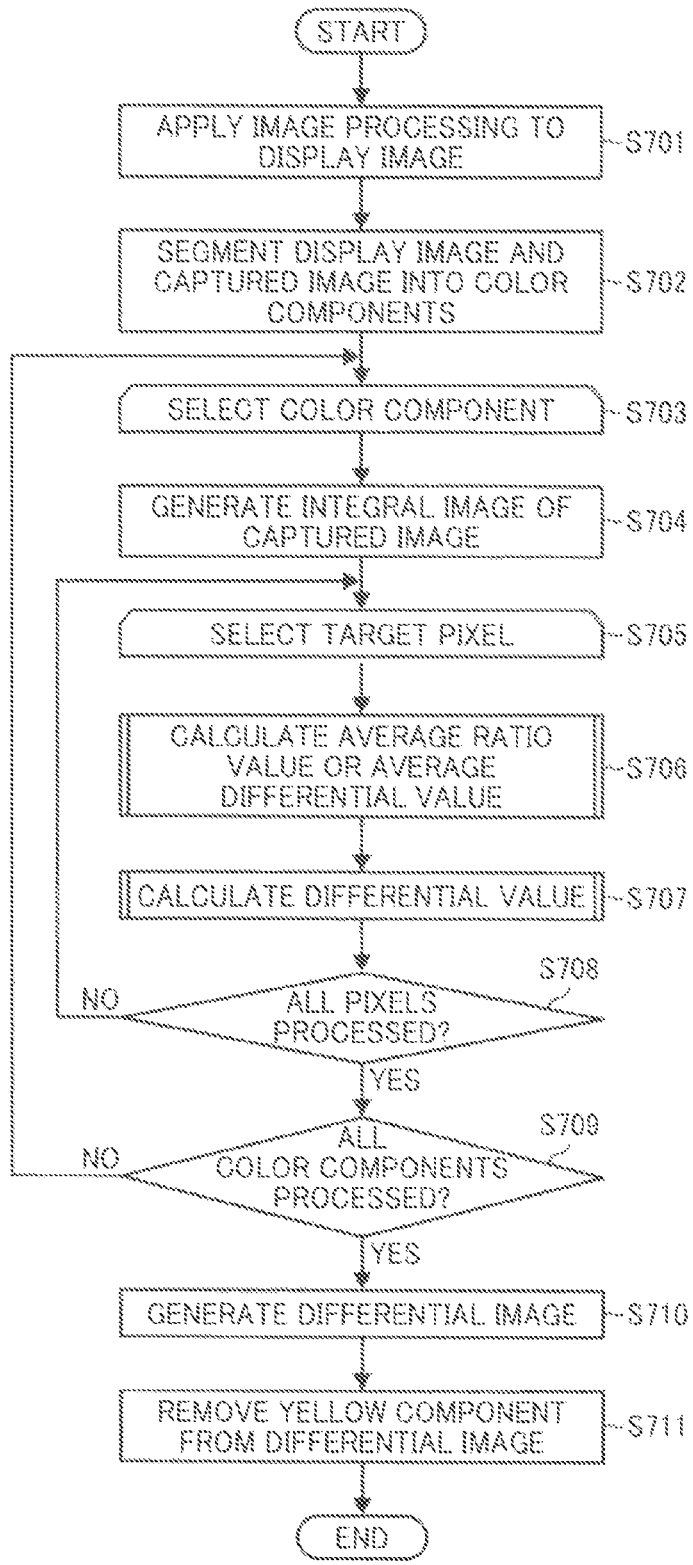
FIG. 7 is a flowchart illustrating operation of generating a differential image, performed by the drawing image sharing apparatus of FIG. 1, according to an example embodiment of the present invention.

Referring now to FIG. 7, operation of generating a differential image, performed by the differential image generator 230 of the drawing image sharing apparatus 118, is explained according to an example embodiment of the present invention. The operation of FIG. 7 is performed at any one of S313, S512, and S605, when the differential image generator 230 receives a request for generating a differential image from the image obtainer 226.

At S701, the differential image generator 230 obtains the previous display image from the display image buffer 224, and applies image processing to the previous display image to thicken the boundaries of the drawing image in the previous display image, for example, by filtering processing.

At S702, the differential image generator 230 obtains the captured image, from the captured image buffer 228. The differential image generator 230 segments the previous display image that is obtained at S701 and the captured image into color components of R, G, and B, respectively.

At S703, the differential image generator 230 selects one of the color components of R, G, and B for processing.

At S704, the differential image generator 230 generates an integral image of the captured image for the selected one of the R, G, and B color components.

At S705, the differential image generator 230 selects a target pixel, respectively, in the previous display image and the captured image, for processing.

At S706, the differential image generator 230 performs calculation of an average ratio value of the target pixel in the previous display image and the captured image for the selected one of R, G, and B color components as described below referring to FIG. 8. Alternatively, the differential image generator 230 performs calculation of an average differential value of the target pixel in the previous display image and the captured image for the selected one of the R, G, and B color components as described below referring to FIG. 9.

At S707, the differential image generator 230 calculates a differential value of the target pixel, as described below referring to FIG. 10, to obtain the brightness value of the pixel to be included in the differential image for the selected one of the color components R, G, and B.

At S708, the differential image generator 230 determines whether all pixels in the previous display image and the captured image have been processed. When it is determined that all pixels in the previous display image and the captured image are processed ("YES" at S708), the operation proceeds S709. When it is determined that all pixels in the previous display image and the captured image are not processed ("NO" at S708), the operation returns to S705 to select another target pixel for processing.

At S709, the differential image generator 230 determines whether all color components have been processed. When it is determined that all color components have been processed ("YES" at S709), the operation proceeds to S710. When it is determined that all color components are not processed ("NO" at S709), the operation returns to S703 to select another color component for processing.

At S710, the differential image generator 230 generates differential images for R, G, and B color components, by combining the pixels each having the brightness value, or the differential value, calculated at S707. The differential image generator 230 then combines the images of R, G, and B color components to generate a differential image.

At S711, the differential image generator 230 removes yellow color components from the differential image, for example, by applying filtering processing to the differential image, and the operation ends. The differential image generated is stored in the differential image buffer 232.

The operation of FIG. 7 may be performed in various other ways. For example, operation of S711 may be optionally performed. Further, a number or a type of color components of the image is not limited to three colors of R, G, and B such that any number or type of colors components of the image may be applied.

Figure 8:
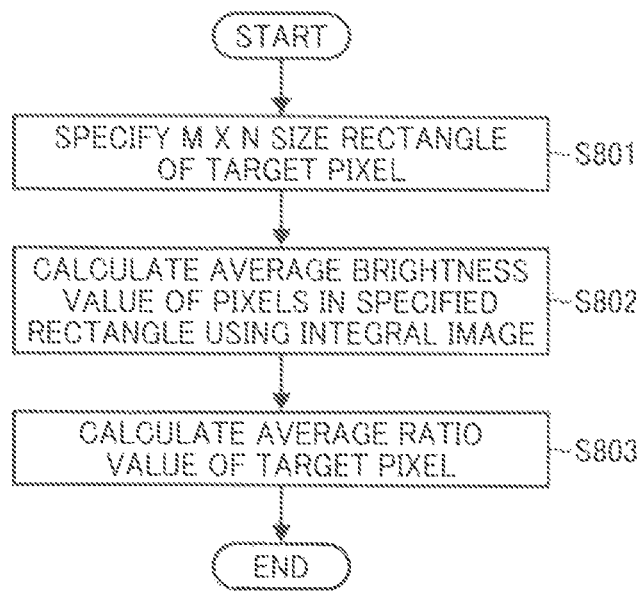
FIG. 8 is a flowchart illustrating operation of calculating an average ratio value, performed by the drawing image sharing apparatus of FIG. 1, according to an example embodiment of the present invention.

FIG. 8 is a flowchart illustrating operation of calculating the average ratio value of the target pixel, performed by the differential image generator 230 at S706 of FIG. 7, according to an example embodiment of the present invention.

At S801, the differential image generator 230 specifies a rectangular area having the m×n size that surrounds the target pixel (x,y).

At S802, the differential image generator 230 calculates an average value AVE of the brightness values of pixels included in the rectangular area specified at S801, using the integral image of the captured image for the selected one of the color components obtained at S704.

At S803, the differential image generator 230 calculates an average ratio value of the target pixel (x,y) using the brightness value of the background color of the captured image, the brightness value of the target pixel (x,y), and the average value AVE of the brightness values of pixels included in the rectangular area obtained at S802, and the operation ends.

Figure 9:
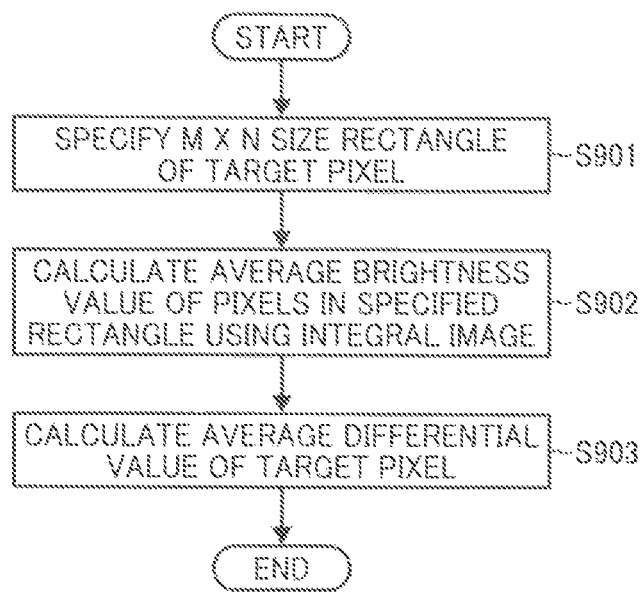
FIG. 9 is a flowchart illustrating operation of calculating an average differential value, performed by the drawing image sharing apparatus of FIG. 1, according to an example embodiment of the present invention.

FIG. 9 is a flowchart illustrating operation of calculating the average differential value of the target pixel, performed by the differential image generator 230 at S706 of FIG. 7, according to an example embodiment of the present invention.

At S901, the differential image generator 230 specifies a rectangular area having the m×n size that surrounds the target pixel (x,y).

At S902, the differential image generator 230 calculates an average value AVE of the brightness values of pixels included in the rectangular area specified at S901, using the integral image of the captured image for the selected one of color components obtained at S704.

At S903, the differential image generator 230 subtracts the average value AVE of the brightness values of pixels included in the rectangular area, from the brightness value of the target pixel (x,y), to calculate the average differential value of the target pixel (x,y), and the operation ends.

Figure 10:
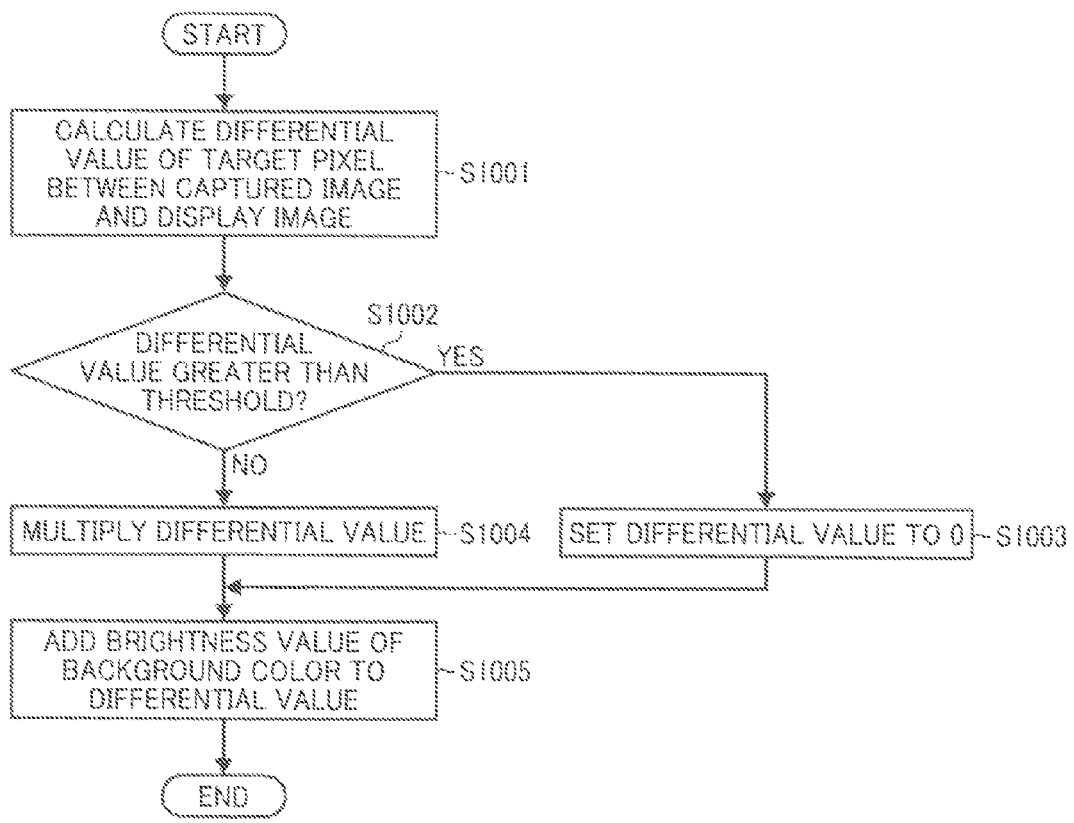
FIG. 10 is a flowchart illustrating operation of calculating a differential value, performed by the drawing image sharing apparatus of FIG. 1, according to an example embodiment of the present invention.

FIG. 10 is a flowchart illustrating operation of calculating a differential value of the target pixel between the previous display image and the captured image, performed by the differential image generator 230 at S707 of FIG. 7.

At S1001, the differential image generator 230 calculates a differential value of the target pixel, which is the difference between a value of the target pixel in the captured image and a value of the target pixel in the target pixel in the previous display image.

At S1002, the differential image generator 230 determines whether the differential value of the target pixel, which is calculated at S1001, is greater than a threshold. When it is determined that the differential value of the target pixel is greater than the threshold ("YES" at S1002), the operation proceeds to S1003. When it is determined that the differential value of the target pixel is equal to or less than the threshold ("NO" at S1002), the operation proceeds to S1004. The threshold is any arbitrary value, which is previously determined. In this example, the threshold is set to −5.

At S1003, the differential image generator 230 sets the differential value of the target pixel to 0.

At S1004, the differential image generator 230 applies correction processing to the target pixel to improve the color intensity of the target pixel, by multiplying the differential value of the target pixel with a constant. In this example, the constant is any number that ranges between 1 and 2. This suppresses the negative influences to the color intensities of the captured image due to capturing, thus improving the visibility of the differential image.

As described above, the brightness value of the target pixel in the differential image is corrected. When the captured image is brighter in pixel values than the display image, the differential image generator 216 suppresses the negative influences due to capturing, such as the reflection light or the influence by a lighting device. When the differential value between the captured image and the display image is relatively small, it is assumed that the differential value is caused due to noise. In such case, the negative influences by noise is eliminated in the differential image.

At S1005, the differential image generator 230 adds the differential value of the target pixel with the brightness value of the background color, and the operation ends.

As described above, the drawing image sharing apparatus 118a receives a background image and a drawing image of the remotely located site for display onto the object 112a. The drawing image sharing apparatus 118a further transmits the background image to the drawing image sharing apparatus 118b of the remotely located site. The drawing image sharing apparatus 118a combines the background image and the drawing image into a combined image for display onto the object 112a. The drawing image sharing apparatus 118a further obtains an image of the object 112a as a captured image. The drawing image sharing apparatus 118a generates a differential image that reflects the difference between the display image and the captured image, and transmits the differential image to the remotely locate site. In this manner, the drawing image and the background image are shared among a plurality of remotely located sites, while suppressing echo phenomena that may be otherwise caused by superimposing of drawing images. This improves visibility of the display image.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a drawing image sharing apparatus for sharing a drawing image with a remotely located site. The drawing image sharing apparatus includes: an image editor to combine a background image to be displayed onto a drawing object and a drawing image received from the remotely located site to generate a combined image; a differential image generator to generate a differential image that reflects the difference between the combined image and a captured image of the drawing object; and a data transmit to transmit the differential image to the remotely located site.

In one example, the drawing image sharing apparatus further includes: a data receive to receive the background image to be displayed onto the drawing object and the drawing image of the remotely located site; an image supplier to supply the combined image for display onto the drawing object; and an image obtainer to obtain the captured image of the drawing object. The data transmit transmits the differential image and the background image to the remotely located site.

In one example, the drawing image sharing apparatus further includes: a data receive to receive the background image for display onto the drawing object and the drawing image of the remotely located site; an image supplier to cause the combined image to be displayed onto the drawing object; and an image obtainer to obtain the image of the drawing object as the captured image. The image editor combines the differential image and the background image into a combined image. The data transmit transmits the combined image to the drawing image sharing apparatus of the remotely located site.

In one example, the data transmit transmits refers to profile data of a drawing image sharing apparatus of the remotely located site to determine whether the drawing image sharing apparatus of the remotely located site is provided with a function of combining the images. When it is determined that the drawing image sharing apparatus of the remotely located site is provided with a function of combining the images, the data transmit transmits the differential image and the background image without combining these images. When it is determined that the drawing image sharing apparatus of the remotely located site is not provided with a function of combining the images, the data transmit transmits the combined image of the differential image and the background image.

In one example, the data transmit refers to profile data of the drawing image sharing apparatus of its own site and profile data of a drawing image sharing apparatus of the remotely located site to determine whether the drawing image sharing apparatus of the remotely located site is lower in processing capability than the drawing image sharing apparatus of its own site. When it is determined that the drawing image sharing apparatus of the remotely located site is lower in processing capability than the drawing image sharing apparatus of its own site, the data transmit transmits the combined image. When it is determined that the drawing image sharing apparatus of the remotely located site is higher in processing capability than the drawing image sharing apparatus of its own site, the data transmit transmits the differential image and the background image without combining.

In one example, the data receive stores the background image in a background image storage, and stores the drawing image of the remotely located site in a drawing image storage.

In one example, the image supplier supplies the combined image to a display device to cause the display device to display the combined image onto the drawing object. The image obtainer causes an image capturing device to capture an image of the drawing object to obtain an image to be shared with the remotely located site.

In one example, the drawing image sharing apparatus further includes an image detector whether a first background image recently received by the data receive matches a second background image previously received by data receive to generate a detection result. When the detection result indicates that the first background image differs from the second background image, the data transmit transmits the first background image.

In one example, the image editor obtains a background image that is related to the drawing image of the remotely located site using identification information of the background image, and combines the obtained background image with the drawing image of the remotely located site to generate the combined image.

In one example, the identification information of the background image includes an identifier for uniquely identifying the background image.

In one example, the image editor further applies size enlargement or size reduction to the background image.

In one example, the image editor further applies processing to the background image to adjust color intensity of the background image.

In one example, the image supplier causes the display device to display a marker image that specifies an area to be shared in the captured image. The image obtainer captures an image of the drawing object including the marker image to obtain the captured image, and specifies a size of the area to be shared based on coordinates of makers included in the marker image.

In one example, the image supplier causes the display device to display a white color image that specifies an area to be shared. The image obtainer captures an image of the drawing object including the white color image, and specifies a size of the area to be shared based on difference in brightness values between a part of the shared area that overlaps with the white color image and the part of the shared area that is not overlapped with the white color image.

In one example, the image obtainer further applies perspective transformation to the captured image.

In one example, the differential image generator further applies processing to the previous display image to thicken the boundaries of the drawing image in the previous display image.

In one example the differential image generator further applies filtering processing to the differential image to remove yellow color components from the differential image.

In one example, the differential image generator further applies image correction to the differential image to adjust color intensity of the differential image.

In one example, the image obtainer further applies perspective transformation to the captured image.

In one example, the image obtainer applies image processing to the previous projection image to erode or dilate boundaries of the area to be shared in the previous projection image. The differential image is generated based on the processed previous projection image.

In one example, the differential image generator applies filtering processing to the differential image to reduce a yellow color component of the differential image.

In one example, the differential image generator applies correction processing to the differential image to improve the color intensity of the differential image.

In another example, the present invention may reside in a drawing image sharing system including: a data receive to receive a drawing image that reflects drawings drawn onto a second drawing object located at a remotely located site that is remote from a site at which a first drawing object is located; an image editor to combine the drawing image of the second drawing object and a background image to be displayed onto the first drawing object, to generate a combined image of the second drawing object; an image supplier to cause a display device to display the combined image of the second drawing object onto the first drawing object as a display image; an image obtainer to cause an image capturing device to obtain an image being displayed onto the first drawing object as a captured image; a differential image generator to obtain a previous display image that is previously displayed onto the first drawing object, and to generate a differential image that reflects the difference between the previous display image and the captured image obtained by the image obtainer; and a data transmit to transmit the differential image to the remotely located site for display onto the second drawing object as a drawing image of the first drawing object.

In one example, the system further includes: a determiner to determine whether the image receive receives the drawing image of the second drawing object. The image obtainer obtains the image being displayed onto the first drawing object when the determiner determines that the image receive receives the drawing image of the second drawing object.

In one example, the system further includes: a timer to count a time period from the time at which the drawing image of the second drawing object is projected onto the first drawing object to generate a counted time value; and a determiner to determine whether the counted time value reaches a predetermined value. The image obtainer obtains the image being displayed onto the first drawing object when the determiner determines that the counted time value reaches the predetermined value.

In one example, the differential image generator calculates an average differential value of each pixel respectively for the previous projected image and the captured image, and calculates a differential value of each pixel to be included in the differential image based on the difference in average differential values between the previous projection image and the captured image.

In one example, the differential image generator calculate an average ratio value of each pixel respectively for the previous projected image and the captured image; and calculate a differential value of each pixel to be included in the differential image based on the difference in average ratio values between the previous projection image and the captured image.

In another example, the present invention may reside in a data processing method performed by a drawing image sharing apparatus. The method includes: combining a background image for display onto a drawing object and a drawing image received from a remotely located site; generating a differential image that reflects difference between the combined image and a captured image obtained by capturing an image of the drawing object; and transmitting the differential image to the remotely located site.

In one example, the method further includes: receiving the background image for display onto the drawing object and the drawing image of the remotely located site; displaying the combined image onto the drawing object; and obtaining the image of the drawing object as the captured image. The differential image and the background image are transmitted to the remotely located site.

In one example, the method further includes: receiving the background image for display onto the drawing object and the drawing image of the remotely located site; displaying the combined image onto the drawing object; obtaining the image of the drawing object as the captured image; combining the differential image and the background image; and transmitting the combined image to the remotely located site.

In one example, the method further includes: referring to profile data of a drawing image sharing apparatus of the remotely located site to determine whether the drawing image sharing apparatus is provided with a function of combining the images. When it is determined that the drawing image sharing apparatus is provided with a function of combining the images, the transmitting transmits the differential image and the background image without combining. When it is determined that the drawing image sharing apparatus is not provided with a function of combining the images, the transmitting transmits the combined image of the differential image and the background image.

In one example, the method further includes: referring to profile data of the drawing image sharing apparatus of its own site and profile data of a drawing image sharing apparatus of the remotely located site to determine whether the drawing image sharing apparatus of the remotely located site is lower in processing capability than the drawing image sharing apparatus of its own site. When it is determined that the drawing image sharing apparatus of the remotely located site is lower in processing capability than the drawing image sharing apparatus of its own site, the transmitting transmits the combined image. When it is determined that the drawing image sharing apparatus of the remotely located site is higher in processing capability than the drawing image sharing apparatus of its own site, the transmitting transmits the differential image and the background image without combining.

In another example, the present invention may reside in a recording medium storing a plurality of instructions which, when executed by a processor, cause the processor to perform any one of the above-descried data processing methods.

For example, the present invention may reside in a recording medium storing a plurality of instructions which, when executed by a processor, cause the processor to perform a drawing image sharing method. The method includes: receiving a drawing image that reflects drawings drawn onto a second drawing object located at a remotely located site that is remote from a site at which a first drawing object is located; combining the drawing image of the second drawing object and a background image to be displayed onto the first drawing object, to generate a combined image of the second drawing object; displaying the combined image of the second drawing object onto the first drawing object as a display image; obtaining an image being displayed onto the first drawing object as a captured image; obtaining a previous display image that is previously displayed onto the first drawing object from a display image memory; generating a differential image that reflects the difference between the previous display image and the captured image; and transmitting the differential image to the remotely located site for display onto the second drawing object as a drawing image of the first drawing object.

The invention claimed is:

1. A drawing image sharing apparatus, comprising:
a data receiver to receive a drawing image that reflects drawings drawn onto a second drawing object located at a remotely located site that is remote from a site at which a first drawing object is located;
an image editor to combine the drawing image of the second drawing object and a background image to be displayed onto the first drawing object, to generate a combined image of the second drawing object;
a background image memory to store the background image to be displayed onto the first drawing object;
an image supplier to cause a display device to display the combined image of the second drawing object onto the first drawing object as a display image;
an image obtainer to cause an image capturing device to obtain an image being displayed onto the first drawing object as a captured image;
a differential image generator to obtain a previous display image that is previously displayed onto the first drawing object, and to generate a differential image that reflects the difference between the previous display image and the captured image obtained by the image obtainer;
a profile data memory to store profile data of a drawing image sharing apparatus of the remotely located site;
a data transmitter to transmit the differential image to the remotely located site for display onto the second drawing object as a drawing image of the first drawing object; and
a determiner to determine a type of request received from the background image memory and control the data transmitter according to the determined type of request, wherein
the profile data stored in the profile data memory includes information regarding whether the drawing image sharing apparatus of the remotely located site has a function of combining images to generate a combined image.

2. The drawing image sharing apparatus of claim 1, further comprising:
a display image memory to store the display image being displayed onto the first drawing object as a previous display image to be used for next processing.

3. The drawing image sharing apparatus of claim 2, wherein:

the data transmitter is further configured to obtain the background image from the background image memory and to transmit the obtained background image to the remotely located site.

4. The drawing image sharing apparatus of claim 3, wherein:
the data receiver is further configured to receive a background image to be displayed onto the first drawing object, the apparatus further comprising:
an image detector to overwrite the background image stored in the background image memory with the background image received by the data receiver when the background image received by the data receiver differs from the background image stored in the background image memory.

5. The drawing image sharing apparatus of claim 4, wherein, when the background image received by the data receiver matches the background image stored in the background image memory, the image editor combines the drawing image and the background image stored in the background image memory to generate the display image, and the data transmitter transmits the display image without transmitting the background image to the remotely located site.

6. The drawing image sharing apparatus of claim 3, wherein:
the data transmitter transmits the background image to the remotely located site when the data receiver receives a request for sending the background image from the remotely located site.

7. The drawing image sharing apparatus of claim 2, wherein:
the data transmitter is further configured to combine the differential image generated by the differential image generator and the background image stored in the background image memory to generate a combined image of a first drawing object, and to transmit the combined image of the first drawing object to the remotely located site for display onto the second drawing object.

8. The drawing image sharing apparatus of claim 7, wherein:
the data transmitter is configured to determine, by referring to the stored profile data, whether the drawing image sharing apparatus of the remotely located site has the function of combining images to generate a combined image, and
when the profile data indicates that the drawing image sharing apparatus of the remotely located site is not provided with a function of combining images, the data transmitter transmits the combined image of the first drawing object to the remotely located site.

9. The drawing image sharing apparatus of claim 8, wherein:
the profile data regarding the drawing image sharing apparatus of the remotely located site, stored in the profile data memory, further includes information regarding processing capability of the drawing image sharing apparatus of the remotely located site,
the profile data memory further stores profile data, including processing capability, of the drawing image sharing apparatus of the site where the first drawing object is located,
the data transmitter determines, by referring to the profile data stored in the profile data memory, whether the drawing image sharing apparatus of the remotely located site has lower processing capability than the drawing image sharing apparatus of the site where the first drawing object is located, and when the data transmitter further determines that the drawing image sharing apparatus of the remotely located site is lower in processing capability than the drawing image sharing apparatus of the site where the first drawing object is located, the data transmitter transmits the combined image of the first drawing object to the remotely located site.

10. The drawing image sharing apparatus of claim 7, wherein:
the image detector is configured to obtain background identification information for identifying a background image received by the data receiver, and to obtain a background image specified by the background identification information from the background image memory as the background image to be combined with the differential image generated by the differential image generator.

11. The drawing image sharing apparatus of claim 2, wherein:
the data transmitter is further configured to add background identification information to the differential image before transmitting the differential image, the background identification information identifying a background image to be combined with the differential image generated by the differential image generator.

12. The drawing image sharing apparatus of claim 2, wherein:
the display image memory is further configured to store a reference image for specifying an area to be shared in the captured image,
the image supplier is further configured to cause the display device to display the reference image onto the first drawing object before the image obtainer causes the image capturing device to capture the image being displayed onto the first drawing object, and
the image obtainer specifies the area to be shared using the reference image included in the captured image, the differential image being generated based on the area to be shared that is specified.

13. The drawing image sharing apparatus of claim 2, wherein:
the image editor is further configured to apply size enlargement or size reduction to the background image.

14. The drawing image sharing apparatus of claim 2, wherein:
the image editor is further configured to apply processing to the background image to adjust luminance of the background image.

15. The drawing image sharing apparatus of claim 2, wherein:
the image obtainer is further configured to apply perspective transformation to the captured image.

16. The drawing image sharing apparatus of claim 2, wherein the differential image generator is further configured to apply at least one of:
processing to the previous display image to thicken boundaries of the drawing image in the previous display image;
filtering processing to the differential image to remove yellow color components from the differential image; and
image correction to the differential image to adjust color intensity of the differential image.

17. A drawing image sharing system, comprising:
a first drawing image sharing apparatus to display an image onto a first drawing object; and a second drawing image sharing apparatus to display an image onto a second drawing object, the second drawing object being located at a remotely located site that is remote from a site at which the first drawing object is located, wherein the first drawing image sharing apparatus includes:

a data receiver to receive a drawing image that reflects drawings drawn onto the second drawing object, from the second drawing image sharing apparatus;

an image editor to combine the drawing image of the second drawing object and a background image to be displayed onto the first drawing object, to generate a combined image of the second drawing object;

a background image memory to store the background image to be displayed onto the first drawing object;

an image supplier to cause a display device to display the combined image of the second drawing object onto the first drawing object as a display image;

an image obtainer to cause an image capturing device to obtain an image being displayed onto the first drawing object as a captured image;

a differential image generator to obtain a previous display image that is previously displayed onto the first drawing object, and to generate a differential image that reflects the difference between the previous display image and the captured image obtained by the image obtainer;

a profile data memory to store profile data of the second drawing image sharing apparatus;

a data transmitter to transmit the differential image to the second drawing image sharing apparatus for display onto the second drawing object as a drawing image of the first drawing object; and a determiner to determine a type of request received from the background image memory and control the data transmitter according to the determined type of request, wherein the profile data stored in the profile data memory includes information regarding whether the second drawing image sharing apparatus has a function of combining images to generate a combined image.

18. The system of claim 17, wherein the first drawing image sharing apparatus stores the background image received from the background image supply apparatus in a memory, and sends the background image stored in the memory to the second drawing image sharing apparatus.

19. A drawing image sharing method, comprising:

receiving a drawing image that reflects drawings drawn onto a second drawing object located at a remotely located site that is remote from a site at which a first drawing object is located;

combining the drawing image of the second drawing object and a background image to be displayed onto the first drawing object, to generate a combined image of the second drawing object;

storing the background image to be displayed onto the first drawing object in a background image memory;

displaying the combined image of the second drawing object onto the first drawing object as a display image;

obtaining an image being displayed onto the first drawing object as a captured image;

obtaining a previous display image that is previously displayed onto the first drawing object from a display image memory;

generating a differential image that reflects the difference between the previous display image and the captured image;

storing profile data, the profile data including information regarding whether there is functionality at the remotely located site to combine to generate a combined image;

transmitting the differential image to the remotely located site for display onto the second drawing object as a drawing image of the first drawing object; and determining a type of request received from the background image memory or from the remotely located site and controlling the transmitting according to the determined type of request.

* * * * *